United States Patent
van der Meijden et al.

(10) Patent No.: US 11,821,233 B2
(45) Date of Patent: Nov. 21, 2023

(54) AUTOMATIC SWIMMING POOL CLEANERS ESPECIALLY ADEPT AT CLIMBING AND CLEANING POOL STAIRS

(71) Applicant: ZODIAC POOL SYSTEMS LLC, Carlsbad, CA (US)

(72) Inventors: Hendrikus Johannes van der Meijden, Midrand (ZA); Abian van der Meijden, Midrand (ZA); Dustin Borg, Poway, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 154 days.

(21) Appl. No.: 17/185,220

(22) Filed: Feb. 25, 2021

(65) Prior Publication Data

US 2021/0277678 A1    Sep. 9, 2021

Related U.S. Application Data

(60) Provisional application No. 62/987,130, filed on Mar. 9, 2020.

(51) Int. Cl.
| | | |
|---|---|---|
| *E04H 4/16* | (2006.01) | |
| *B01D 29/31* | (2006.01) | |
| *B01D 29/58* | (2006.01) | |
| *C02F 1/00* | (2023.01) | |
| *C02F 103/42* | (2006.01) | |

(52) U.S. Cl.
CPC .......... *E04H 4/1654* (2013.01); *B01D 29/31* (2013.01); *B01D 29/58* (2013.01); *C02F 1/001* (2013.01); *C02F 2103/42* (2013.01)

(58) Field of Classification Search
CPC ...... E04H 4/1654; B01D 29/31; B01D 29/58; C02F 1/001; C02F 2103/42
USPC ........... 210/167.16, 167.17, 232, 238, 416.1, 210/416.2; 15/1.7
See application file for complete search history.

(56) References Cited

U.S. PATENT DOCUMENTS

| | | | | |
|---|---|---|---|---|
| 2,923,954 A | * | 2/1960 | Babcock | A47L 7/0042 210/167.16 |
| 3,012,676 A | * | 12/1961 | Englesberg | E04H 4/12 D23/209 |
| 3,349,919 A | * | 10/1967 | Royer | B01D 29/15 210/232 |

(Continued)

FOREIGN PATENT DOCUMENTS

| | | | |
|---|---|---|---|
| CN | 112112452 A | * | 12/2020 |
| EP | 1905925 | | 4/2008 |

(Continued)

OTHER PUBLICATIONS

Machine-generated English translation of CN 112112452, dated Oct. 13, 2022.*

(Continued)

*Primary Examiner* — Fred Prince
(74) *Attorney, Agent, or Firm* — Kilpatrick Townsend & Stockton LLP

(57) ABSTRACT

Described are apparatus, systems, and methods of improving cleaning of, e.g., stairs of swimming pools. Automatic swimming pool cleaners (APCs) capable of autonomous (Continued)

movement within water-containing vessels may be utilized to provide enhanced cleaning of sections of the vessels containing stairs or other angled surfaces.

15 Claims, 16 Drawing Sheets

(56) References Cited

U.S. PATENT DOCUMENTS

| | | | | |
|---|---|---|---|---|
| 6,206,547 | B1* | 3/2001 | Erlich | E04H 4/1654 362/399 |
| 6,412,133 | B1* | 7/2002 | Erlich | E04H 4/1663 15/1.7 |
| 8,627,533 | B2* | 1/2014 | Pichon | E04H 4/1654 210/167.16 |
| 9,670,688 | B2* | 6/2017 | Erlich | E04H 4/1654 |
| 10,246,894 | B2 | 4/2019 | Deloche et al. | |
| 2009/0277821 | A1* | 11/2009 | Hui | E04H 4/1654 210/167.16 |
| 2016/0145885 | A1* | 5/2016 | Hui | E04H 4/1663 210/138 |
| 2018/0155947 | A1* | 6/2018 | Hayes | B04C 5/24 |
| 2019/0345728 | A1 | 11/2019 | Adlivankin et al. | |
| 2021/0277678 | A1 | 9/2021 | van der Meijden et al. | |

FOREIGN PATENT DOCUMENTS

| | | | |
|---|---|---|---|
| EP | 3023561 | A1 * | 5/2016 |
| WO | WO 2016/209973 | A1 * | 12/2016 |

OTHER PUBLICATIONS

Machine-generated English translation of CN 112112452, generated on Mar. 14, 2023.*
International Application No. PCT/US2021/019623, International Search Report and Written Opinion dated Aug. 9, 2021, 18 pages.
International Application No. PCT/US2021/019623, International Preliminary Report on Patentability dated Sep. 22, 2022, 13 pages.
International Application No. PCT/US2021/019623, Invitation to Pay Additional Fees and, Where Applicable, Protest Fee dated Jun. 18, 2021, 5 pages.
U.S. Appl. No. 17/185,220 entitled Automatic Swimming Pool Cleaners Especially Adept at Climbing and Cleaning Pool Stairs filed Feb. 25, 2021.

* cited by examiner

The vacuum inlet to the cleaner is positioned at or near the pivot point of the brush and pivoting arm. This geometric relationship between the inlet, brush and arm allow the inlet to maintain its position behind the brush and adjacent to the pool floor when the brush is positioned on either side of the cleaner body.

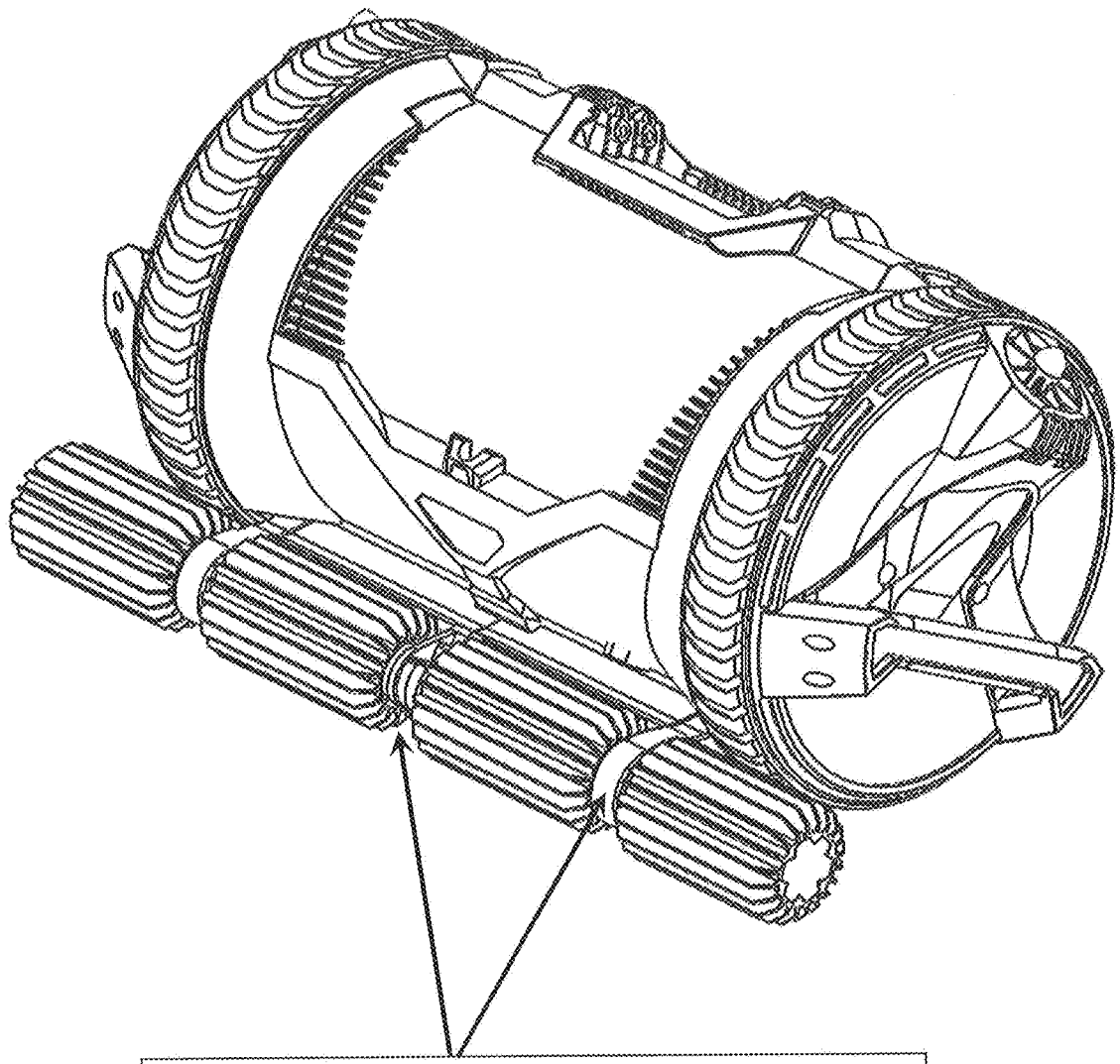

The pivoting arm houses one or more sensors. There are one or more sensors that point toward the floor and one or more sensors pointed forward to read sensor signals below or in front of the cleaner respectively. As the pivoting arm pivots under the cleaner to reposition itself on the other side of the cleaner body, the one or more sensors that pointed toward the floor will point forward and the one or more sensors that pointed forward will point toward the floor. The sensor's functions for reading sensor signals below or in front of the cleaner will change along with the sensor orientation change.

FIG. 4

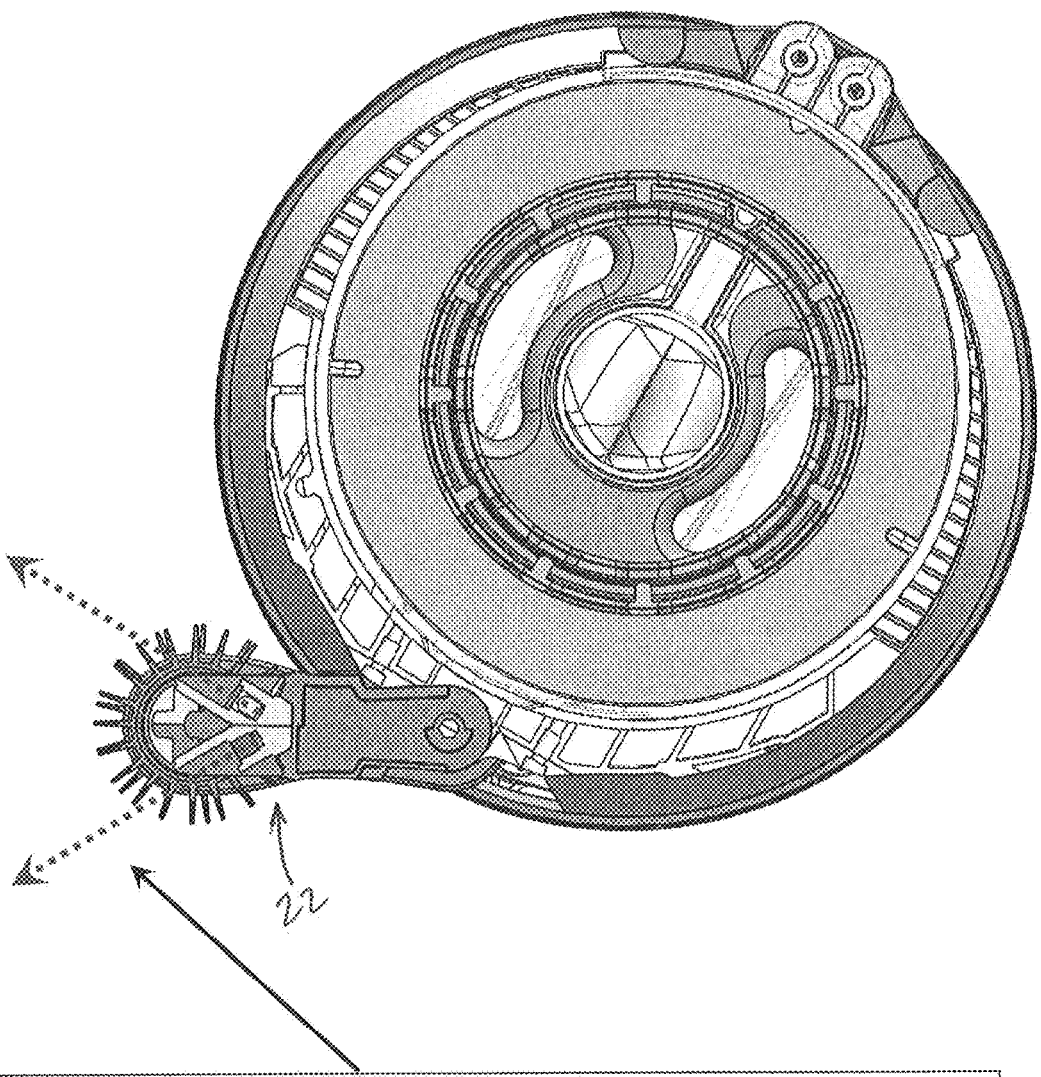

The cleaner's ability to detect objects (such as walls and steps) or lack of objects in front of it, and floor or lack of floor below it allows the cleaner to effectively manage cleaning stairs and/or climbing stairs. The sensor orientation combined with the cylindrical shape and pivoting sensor bar allows the robot to clean back and forth on the depth of a step without driving too far and falling off the end of a step and without driving too far and climbing onto the next step. In addition to the back and forth cleaning of a step, the cleaner can drift sideways in either direction by biasing the power of 1 of the 2 the pumps aimed through the wheel hub, 1 pump on each side.

FIG. 6

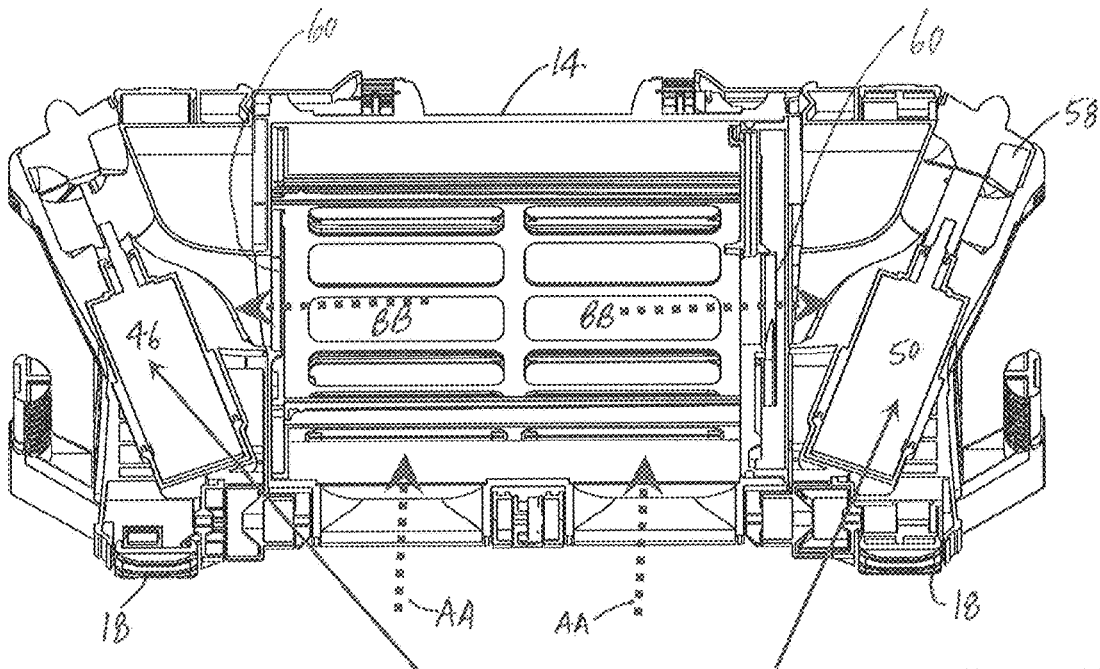

The cleaner has 2 pumps, 1 on each side (left side and right side). Both pumps draw water into the canister from the pool surface, though the filter, then in a direction that is perpendicular to the pool surface and through the wheel hub, and finally exhausting the water out of the cleaner.

The canister's inlet and outlet are perpendicular to each other.

The outlet direction of the pump is in a direction that is angled back relative to the driving direction of the cleaner, angled away from the surface being cleaned, and angled out to the side of the cleaner relative to a plane dividing the left side and right side of the cleaner.

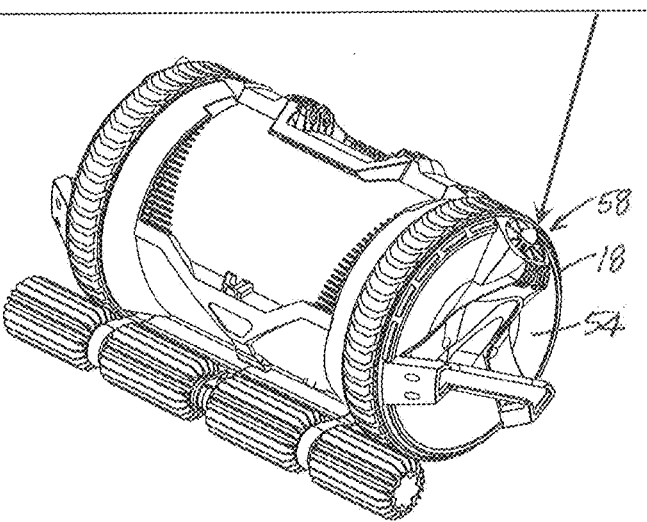

FIG. 7

By positioning a pump that produces thrust on both sides of the cleaner and angling them away from the surface being cleaned, back relative to the driving direction, and out to the side relative to a plane dividing the cleaner into a left side and right side, the thrust from the 2 pumps can be controlled independently to improve navigation control. This improvement in navigation control is most useful when navigating on walls, stairs, and other obstacles.

In addition, when the cleaner is being retrieved from a pool it will climb the wall and use the optimally angled pump thrust to turn sideways so that one side (left or right) is pointed up toward the person retrieving the cleaner. The pump on the side pointed toward the person would be slowed or turned off so that the thrust is not aimed at the person retrieving the cleaner. The pump and thrust aimed away from the person will be maintained at a level that will keep the cleaner at the water's surface for retrieval.

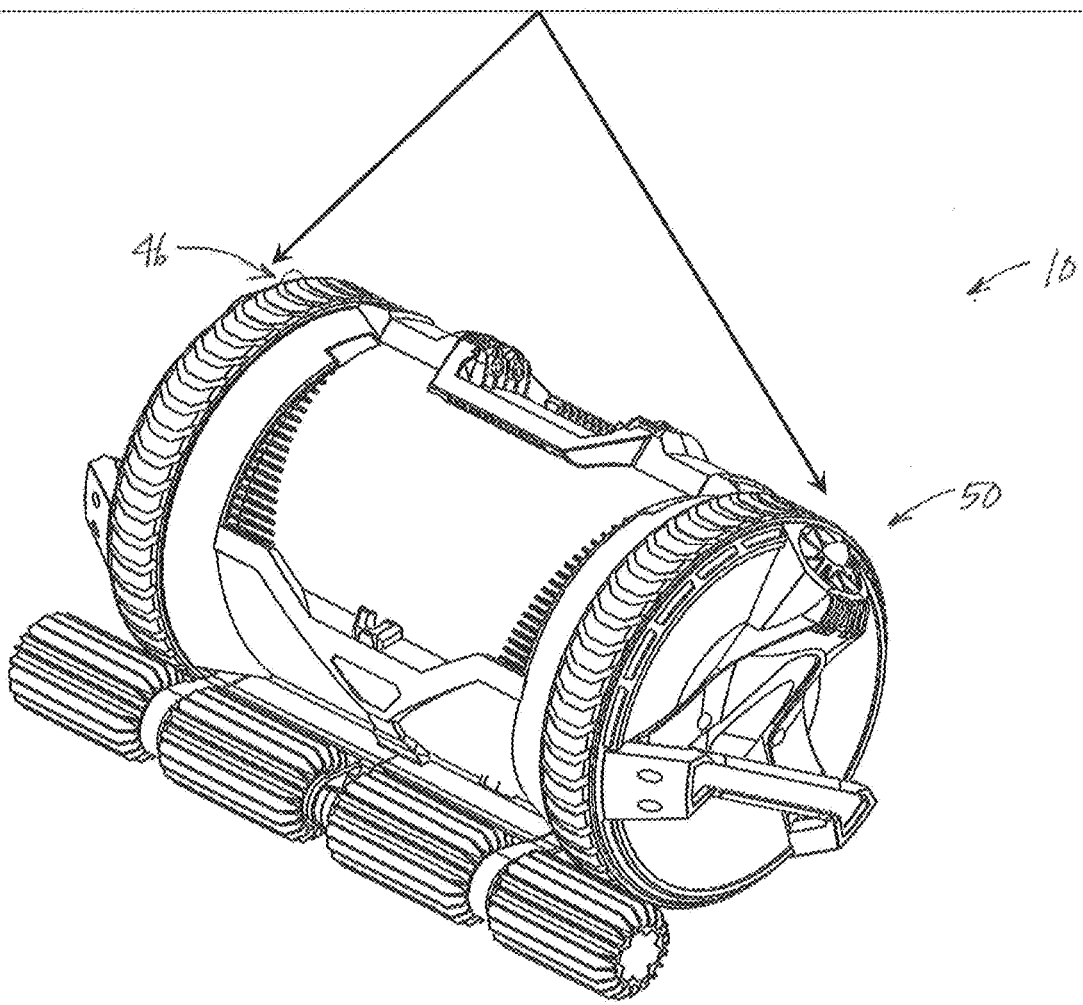

FIG. 8

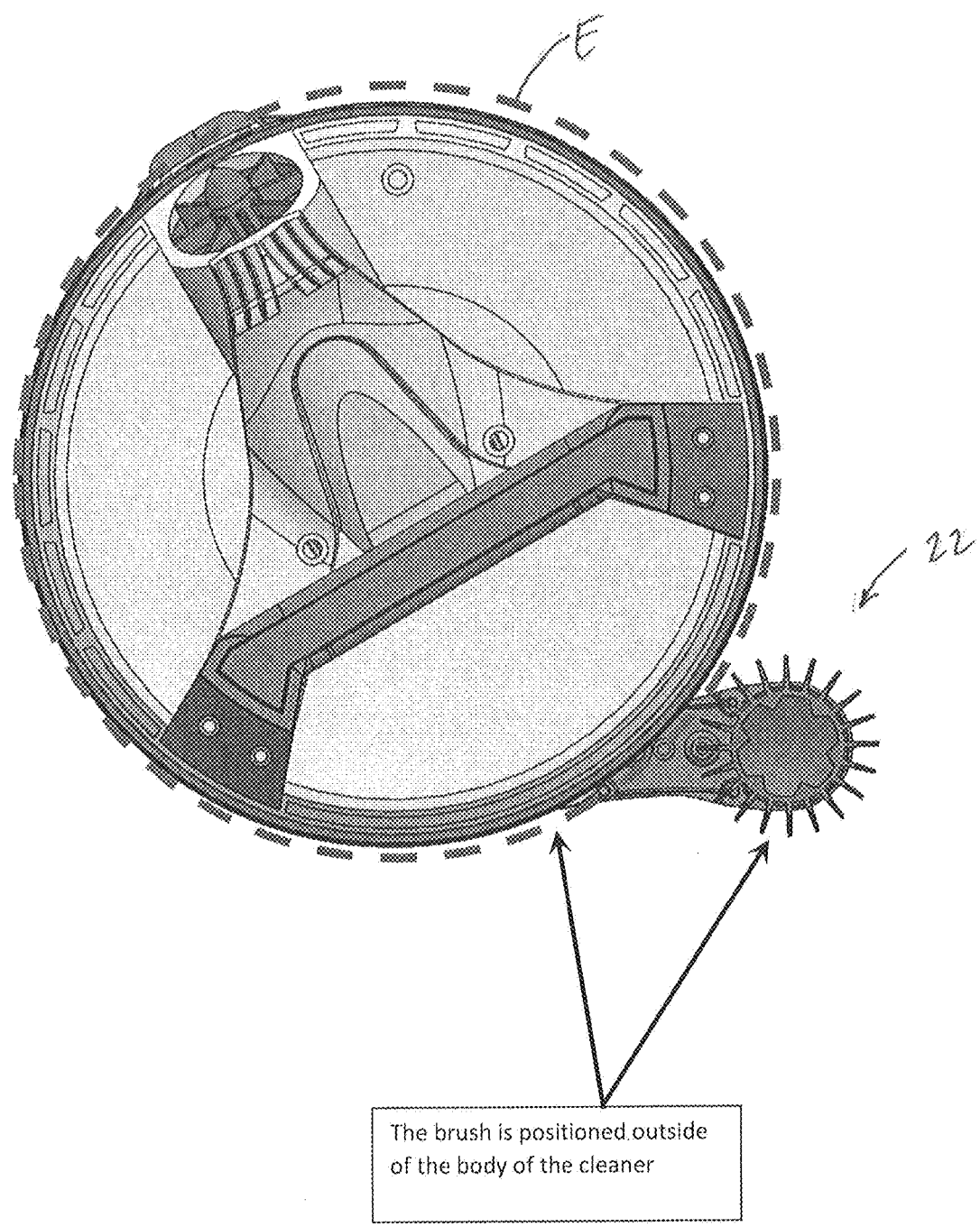

A water sensor is positioned inside the canister. The internal water sensor can help protect the pump motors from run dry conditions. The sensor also provides feedback to turn the pumps off after running the lift system cycle. The lift system cycle involves pumping the internal water out of the cleaner as the cleaner is lifted out of the water.

AUTOMATIC SWIMMING POOL CLEANERS ESPECIALLY ADEPT AT CLIMBING AND CLEANING POOL STAIRS

CROSS-REFERENCE TO RELATED APPLICATION

This application claims the benefit of and priority to U.S. Provisional Patent Application Ser. No. 62/987,130, filed Mar. 9, 2020, the entire contents of which are hereby incorporated herein by this reference.

FIELD OF THE INVENTION

This invention relates to cleaning devices capable of autonomous movement in water-containing vessels such as swimming pools or spas and more particularly, although not necessarily exclusively, to cleaners, systems, and methods providing enhanced cleaning of sections of the vessels containing stairs or other angled surfaces.

BACKGROUND OF THE INVENTION

U.S. Patent Application Publication No. 2019/0345728 of Adlivankin, et al., whose entire contents are incorporated herein by this reference, describes an automatic swimming pool cleaner (APC) with a tilt sensor and a controller "configured to detect ascending or descending a stair of [a pool] stairway in accordance with a sensed tilt of the pool cleaner." See Adlivankin, p. 1, ¶0006. The APC also may include a depth sensor similarly "configured to detect ascending or descending a stair of the stairway." See id., ¶0011. When the cleaning device has ascended to a highest permissible stair, the controller either stops operation of the device or reverses its direction of motion. See id., ¶¶0013-0016.

Absent from the Adlivankin application is any description of structures designed to facilitate climbing and improve cleaning of, for example, stairs or other angled sections of pools or spas. Hence, although the APC of the Adlivankin application may recognize when it has ascended or descended a stair and stop operation or reverse direction accordingly, the cleaner otherwise is structured conventionally. If a stair is narrow or longer than the width of the APC, the cleaner of the Adlivankin application is unlikely to clean it effectively.

SUMMARY OF THE INVENTION

The present invention provides apparatus, systems, and methods for improving cleaning of, e.g., these types of stairs.

BRIEF DESCRIPTION OF THE DRAWINGS

FIG. 4 is a perspective view of the APC of FIG. 1.

FIG. 6 is a cross-sectional view of the APC of FIG. 1.

FIG. 7 are perspective and cross-sectional views of the APC of FIG. 1.

FIG. 8 is a perspective view of the APC of FIG. 1.

FIG. 9 is an end elevational view of the APC of FIG. 1.

DETAILED DESCRIPTION

Figure 1:
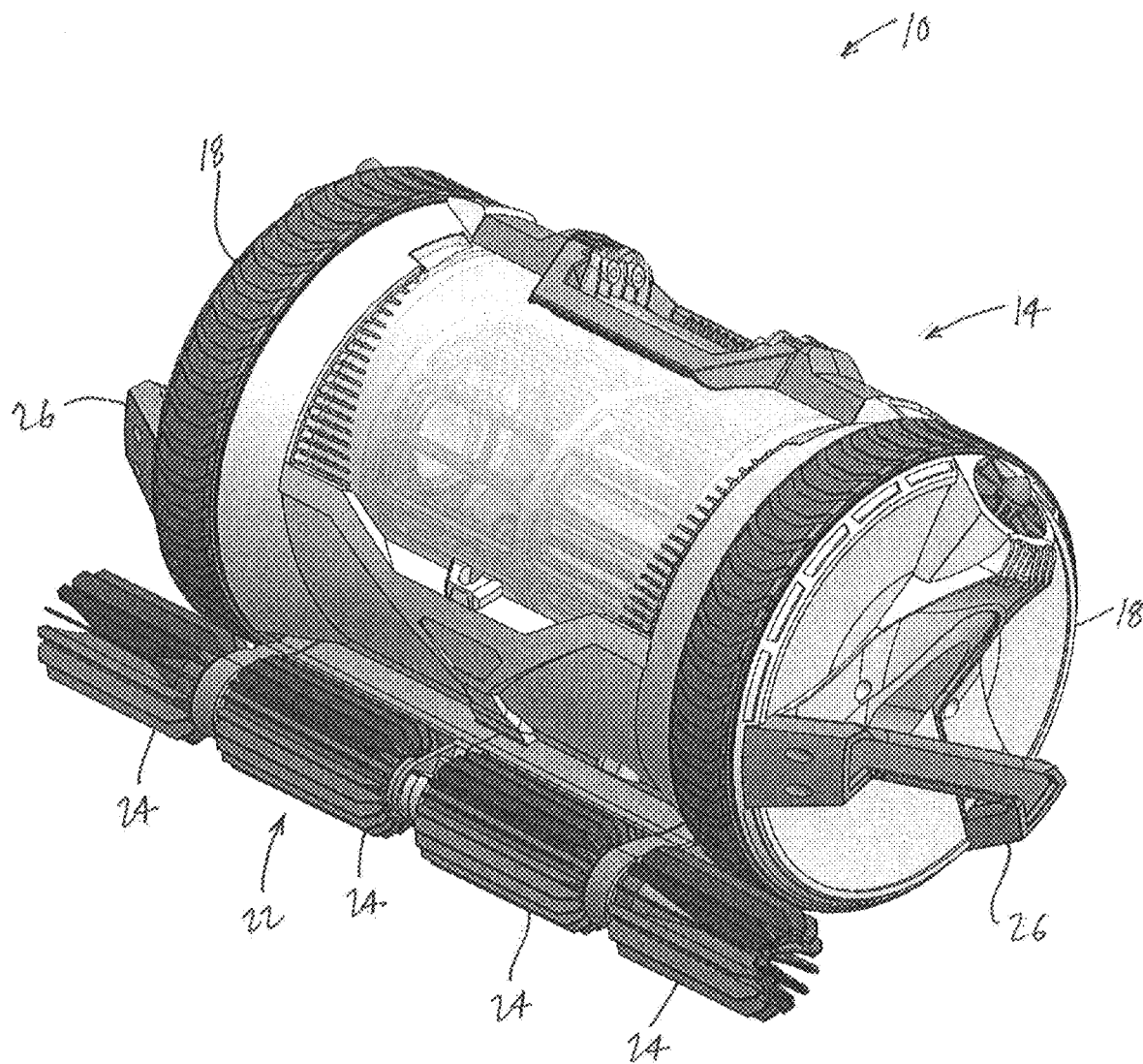
FIG. 1 is a perspective view of an exemplary APC consistent with the present invention.

FIG. 1 illustrates an exemplary APC 10 which may incorporate features of the invention. APC 10 advantageously is a "robotic" cleaner, employing language of the Adlivankin application. However, at least some features of the invention may be utilized with "hydraulic" cleaners too.

APC 10 may include at least body 14, motive elements 18, and brush assembly 22 containing one or more brushes 24. Also depicted in FIG. 1 are optional handles 26, which as shown may be connected to (or formed as part of) hub 54. Body 14 advantageously may be shaped in generally cylindrical manner with a maximum diameter approximating that of motive elements 18, which preferably (but not necessarily) are wheels.

Figure 2:
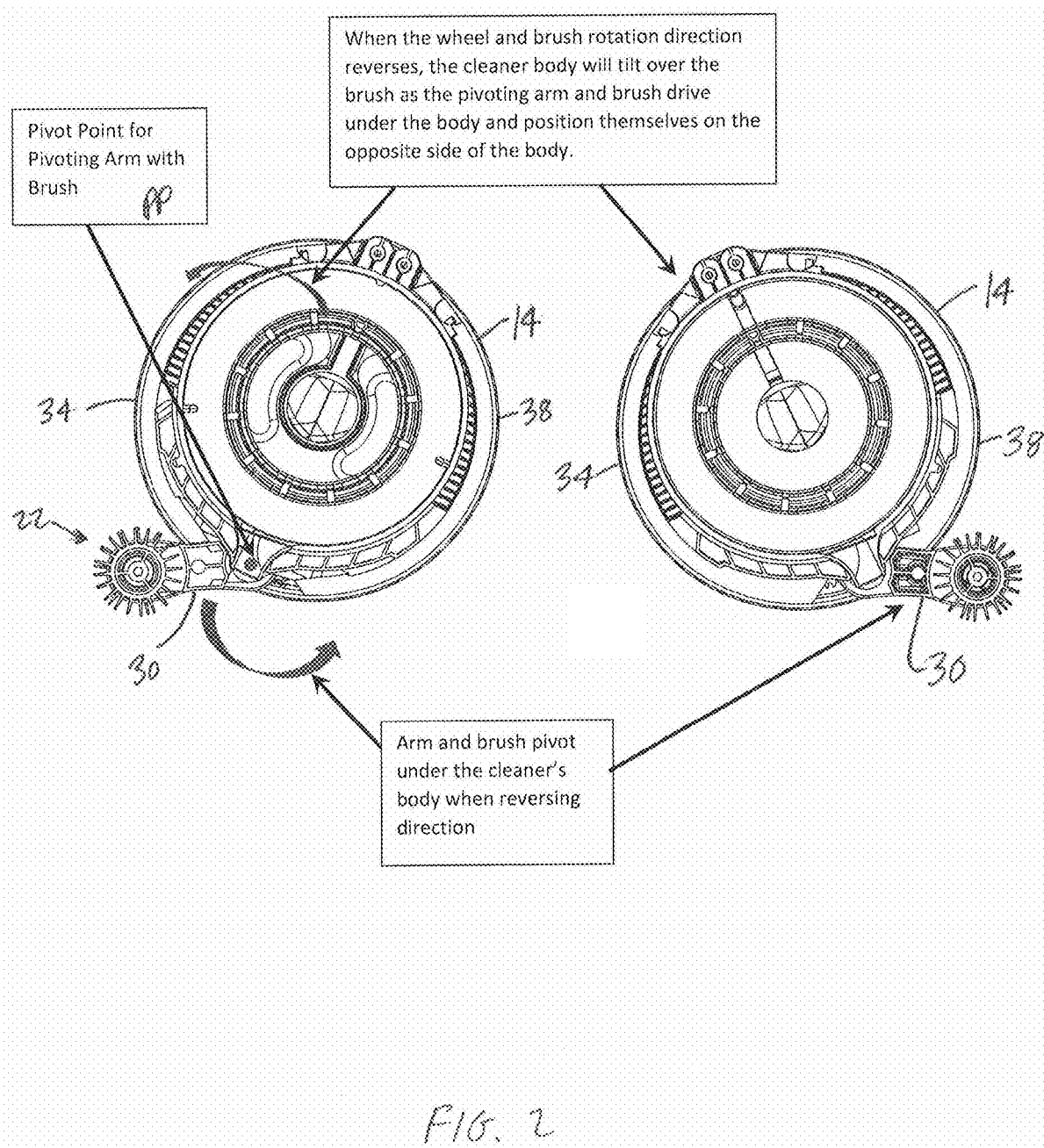
FIGS. 2-3 are cross-sectional views of the APC of FIG. 1.

FIG. 2 illustrates the pivoting nature of brush assembly 22. Included as part of the brush assembly 22 may be at least one arm 30 functioning to connect brushes 24 to body 14. Positioning, for example, a pin or rod through an opening of arm 30 may allow arm 30 to connect to body 14 in a manner allowing the arm 30 to pivot relative to the body 14. FIG. 2 shows such a connection about a pivot point PP. If multiple arms 30 are utilized, a pivot point may be established for each arm 30, with each of the pivot points preferably aligned along a common axis. Aligning the pivot points may produce a structure like that of FIG. 1, in which brushes 24 also are aligned along a common axis of rotation.

Figure 5:
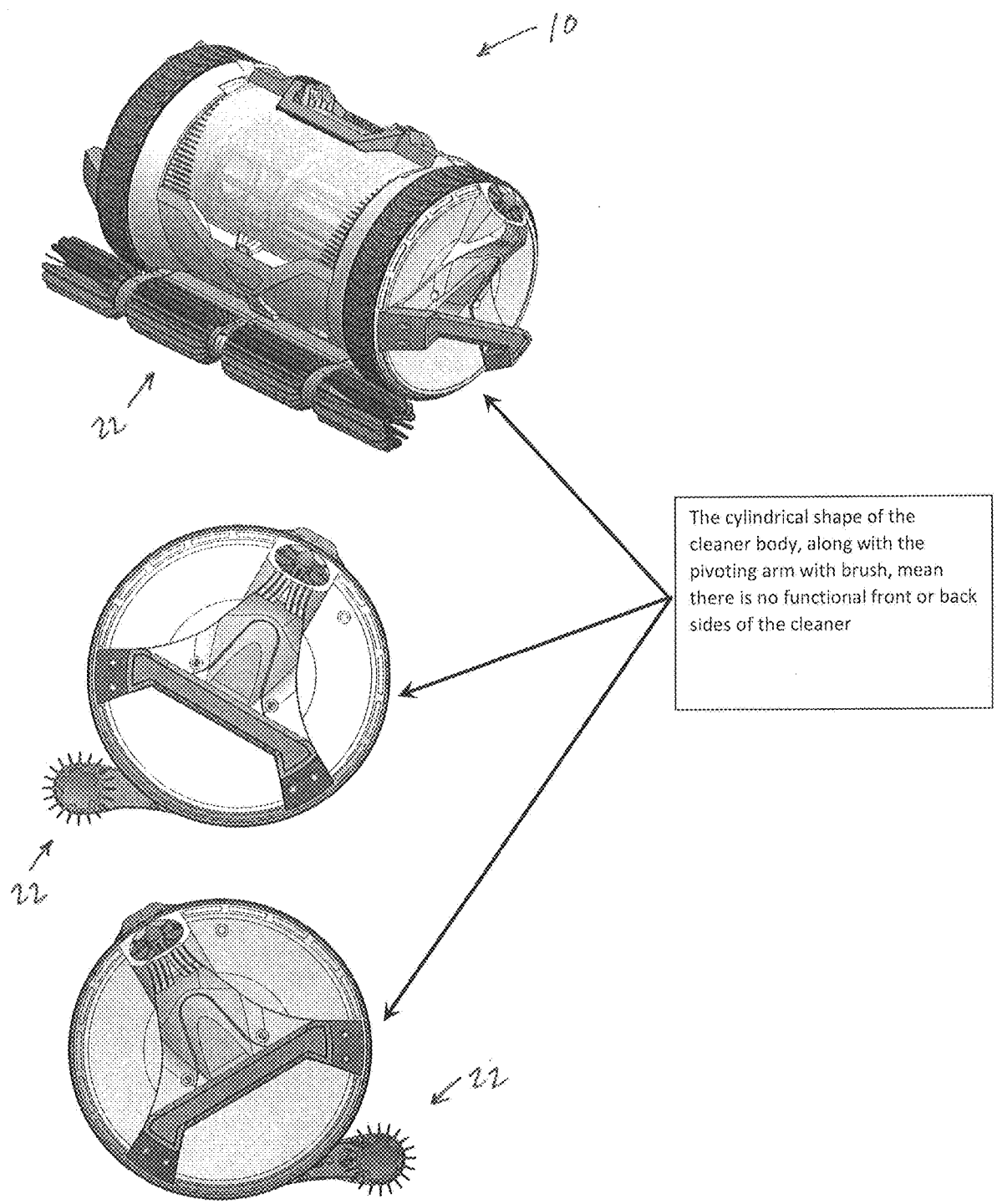
FIG. 5 are perspective and end elevational views of the APC of FIG. 1.

The generally-cylindrical shape of body 14 and pivoting nature of brush assembly 22 result in APC 10 not necessarily having any true "front" or "rear" (see FIG. 5). For purposes of explanation, FIG. 2 identifies a nominal "first side" 34 and a nominal "second side" 38 of body 14. In the left-hand view of FIG. 2, APC 10 may be travelling to the left of the page, with brush assembly 22 forming the forwardmost component in the direction of travel adjacent first side 34. When rotation of motive elements 18 and brushes 24 reverses, body 14 will tilt over brush assembly 22 as brushes 22 pivot and drive under the body 14, resulting in brush assembly 22 being adjacent second side 38 (as shown in the right-hand view of FIG. 2). The brush assembly 22 thus continues to form the forwardmost component in the direction of travel, as APC 10 is travelling to the right of the page.

Figure 3:
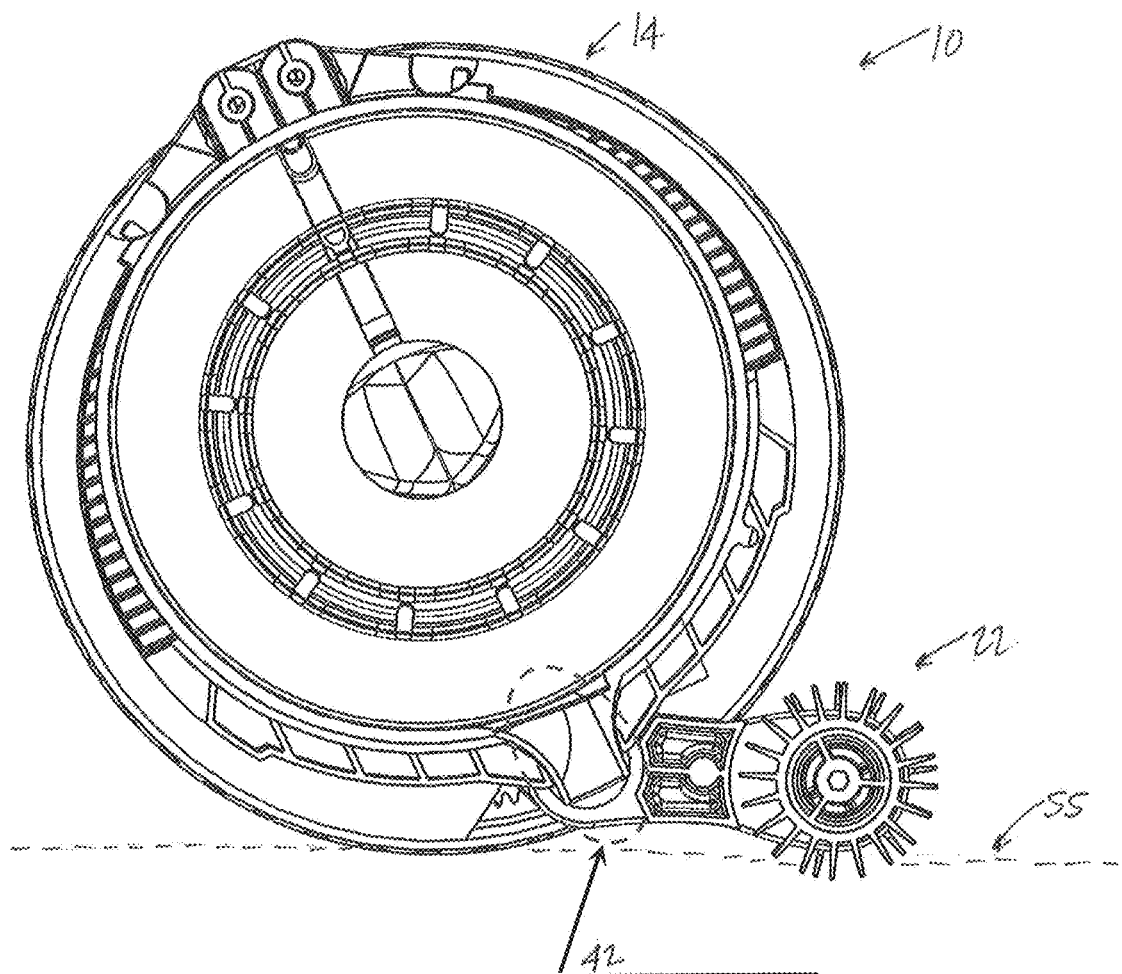

Consistent with conventional pool cleaners, body 14 of APC 10 may include an inlet 42 into which debris-laden water is drawn for filtering. As shown in FIG. 3, inlet 42 may be positioned at or near pivot points PP. Advantageously, inlet 42 is maintained in a position behind brush assembly 22 (as determined by the direction of travel of body 14) and adjacent the pool floor or other submerged surface SS on which APC 10 is travelling—except, of course, when the brush assembly 22 itself is pivoting from first side 34 to second side 38 or vice-versa.

Brush assembly 22 may contain one or more sensors (see FIG. 4). As brush assembly 22 typically will be the forwardmost component of APC 10 as it travels, these sensors should be capable of sensing, among other things, information relating to objects which APC 10 is approaching. Text associated with FIG. 4 refers to some sensors being oriented toward the submerged surface SS on which APC 10 is travelling, while other sensors are oriented forward of the body 14. Persons skilled in the art will recognize, however, that sensors of APC 10 may be located and oriented anywhere, and in any manner, as desired.

FIG. 6 provides more information concerning sensors of APC 10. Forwardly-directed sensors contained in brush assembly 22 enhance the ability of APC 10 to detect objects (such as but not limited to walls and steps), or lack of objects, forward of it. Similarly, downwardly-oriented sensors improve capability of APC 10 to detect the presence, or absence, of submerged surface SS and objects protruding therefrom. The sensors thus permit APC 10 more effectively to manage cleaning and autonomous climbing of, e.g., stairs. Combined with the shape of body 14 and pivoting nature of brush assembly 22, the sensors allow APC 10 to clean back and forth on the surface of a step without driving too far and either falling off the end of the step or climbing onto an adjacent step.

In addition to travelling back and forth on a step, APC 10 may drift sideways ("crab walk" laterally) on a step by biasing power of its internal pumps. As illustrated in FIG. 7, APC 10 may include pumps 46 and 50 beneficially positioned at opposing end regions of body 14. Indeed, pumps 46 and 50 may be positioned either wholly or partly within body 14 or, as shown in FIG. 7, at least partly within motive elements 18 (or hubs 54 containing motive elements 18; see FIG. 13). Pumps 46 and 50, furthermore, may be structured in any appropriate manner, with one of many examples of such a structure being described in U.S. Pat. No. 10,246,894 to Deloche, et al., as having a motor and an impeller.

In use, pumps 46 and 50 may draw debris-laden pool water through one or more inlets 42 (see arrows AA of FIG. 7) into a filter contained in whole or in part within body 14. As with pumps 46 and 50, the filter too may be structured as desired. Filtered water then travels generally laterally, as shown by arrows BB, to an exterior surface 54 of each motive element 18 where it is exhausted to the pool through outlet 58 of APC 10.

Advantageously, a direction of fluid flow (e.g. AA) through at least one inlet 42 is perpendicular (or generally so) to the fluid flow direction (e.g. BB) through each filter outlet 60. The exhausted fluid flow direction through outlet 58 also preferably is angled relative to the direction of travel of APC 10. FIG. 7 depicts an angle of approximately 30°, although the angle could be smaller or larger than depicted. This exit fluid flow direction additionally may be (1) angled away from submerged surface SS being cleaned as well as (2) angled to the side of APC 10 relative to a plane dividing the end regions of body 14.

As explained in connection with FIG. 8, thrust from pumps 46 and 50 may be controlled independently to improve navigation control. Pumps 46 and 50 also may be positioned at opposing end regions of body 14, as noted above and angled (1) away from surface SS being cleaned, (2) back relative to the driving direction of travel of APC 10, and (3) to the sides of APC 10 relative to a place dividing body 14 into left and right sides. This preferred positioning of pumps 46 and 50 is well illustrated in FIGS. 7-8 and, together with their independent thrust control, especially facilitates navigation of APC 10 on walls, stairs, and other obstacles.

Additionally, these aspects of pumps 46 and 50 facilitate retrieval of APC 10 from a swimming pool following use. APC 10 may climb a wall of the pool and use angled thrust from the pumps 46 and 50 to turn sideways so as to present one or the other opposing end regions—with a corresponding handle 26—to a person standing on the deck surrounding the pool, thus facilitating the person's grasping of the handle 26. The pump 46 or 50 on the side of body 14 presented to the person may be slowed or turned off so as not to exhaust water at the person, while the pump 50 or 46 on the opposite side of body 14 may continue to operate at a level sufficient to maintain the APC 10 at the pool surface for retrieval.

Shown in FIG. 9 is that an envelope E may be defined for body 14. Brush assembly 22 advantageously is positioned outside of envelope E. This positioning helps ensure brush assembly 22 remains the forwardmost component of APC 10, as discussed earlier.

Figure 10:
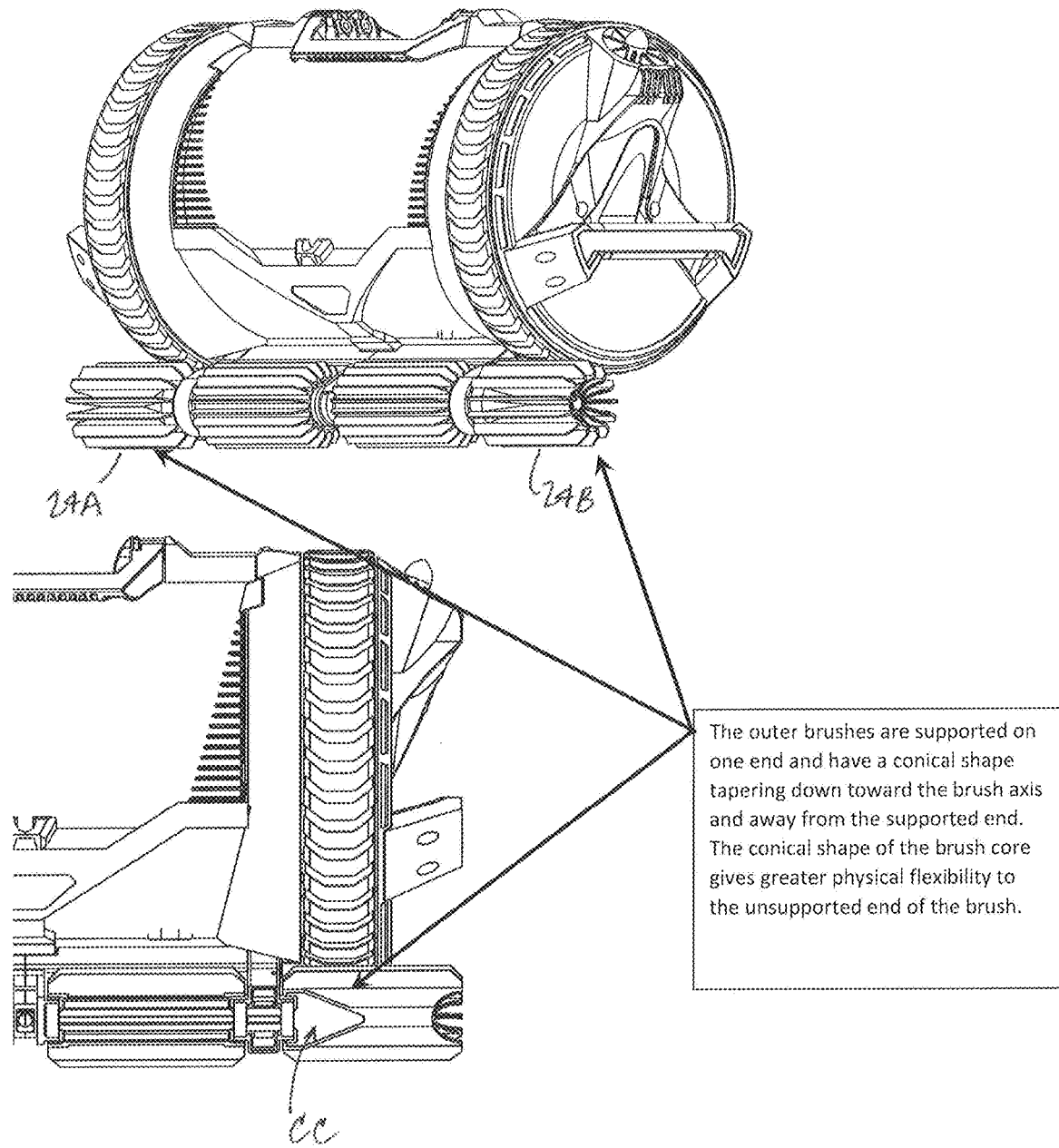
FIG. 10 are perspective and cross-sectional views of the APC of FIG. 1.

Outer brushes 24A-B are illustrated in FIG. 10. Each is supported on one end and has a conical core shape CC tapering toward the common axis of rotation and away from its supported end. The conical core shape CC of brushes 24A-B provides greater physical flexibility to the unsupported end.

Figure 11:
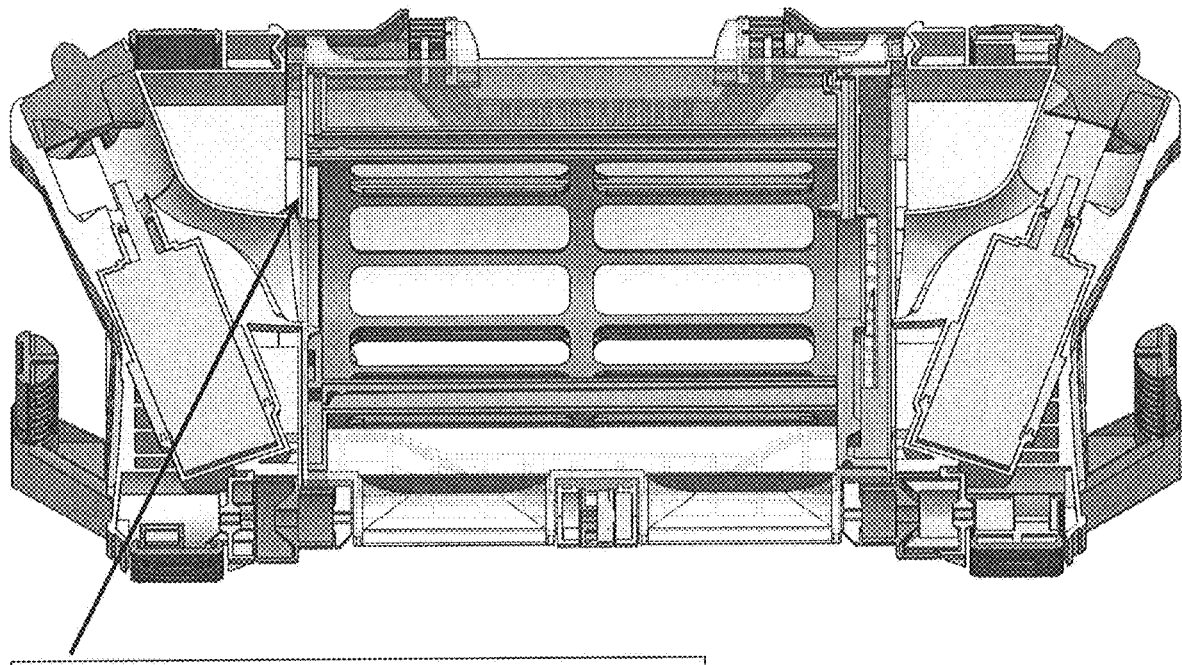
FIGS. 11-13 are cross-sectional views of the APC of FIG. 1.

A water sensor may be carried by APC 10, preferably within body 14 (see FIG. 11). The sensor may help prevent motors of pumps 46 and 50 from being damaged should water cease to be available for pumping. It also may be used in connection with a lift-system cycle which intentionally operates either or both of pumps 46 and 50 to pump water out of body 14 as APC 10 is being removed from the pool, with the sensor providing feedback that operation of the pumps should cease because water no longer is present within body 14.

Figure 12:
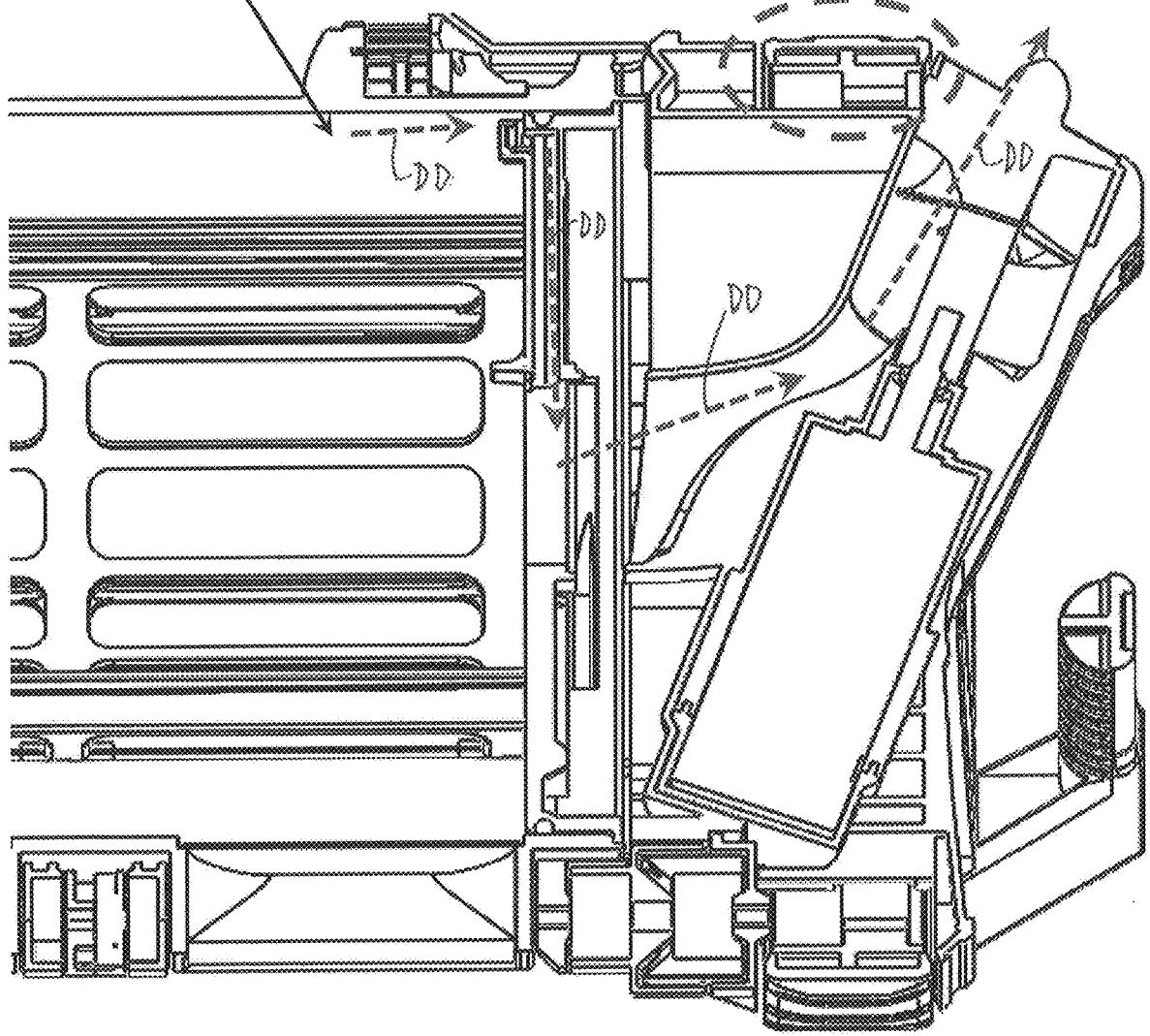

Arrows DD of FIG. 12 illustrate a flow path for moving air trapped within body 14 to an input of pump 46 or 50. The structure of body 14 bounding the flow path of arrows DD effectively functions as a "straw" to draw trapped air to a pump to be exhausted. Ring wheel 61 may be used so that pumps 46 and 50 can pull water from the canister and exhaust it in the preferred direction (back, out, and up) within the cylindrical shape of cleaner 10. A centerless ring wheel is beneficial in exhausting water in the preferred position and direction.

Figure 13:
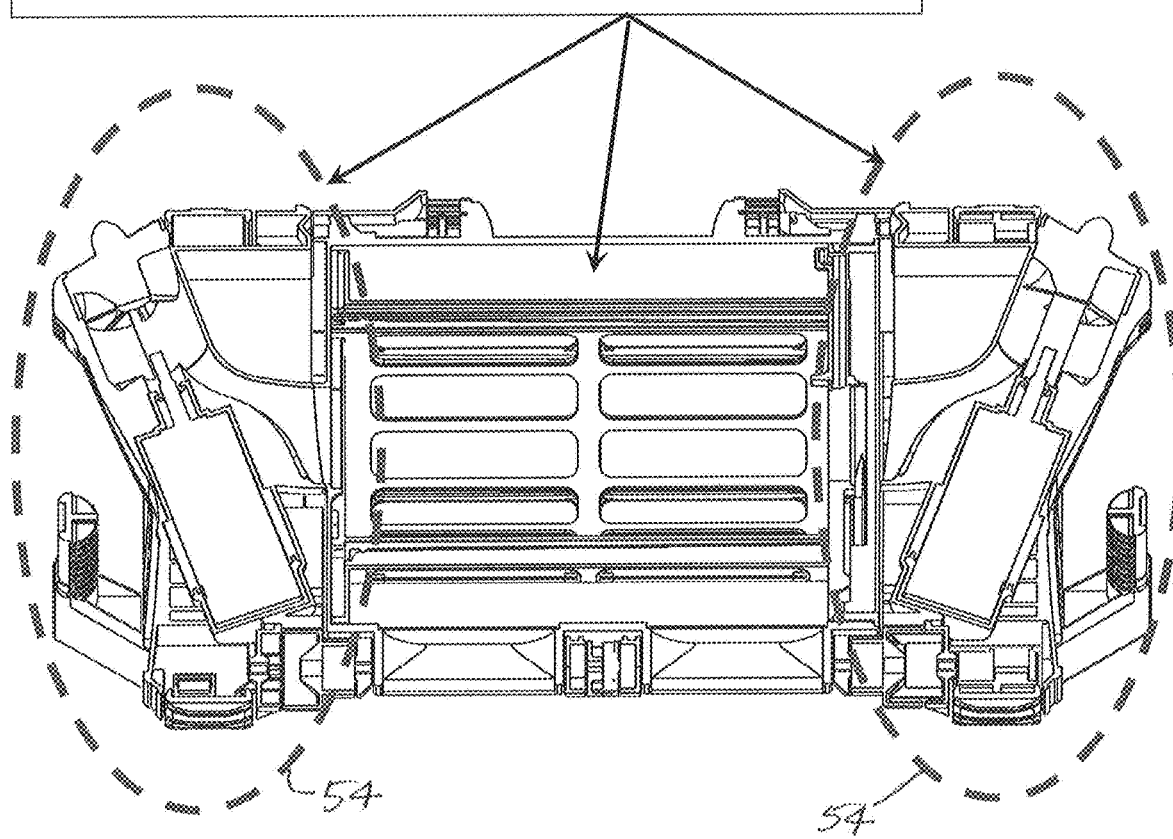
Figure 14:
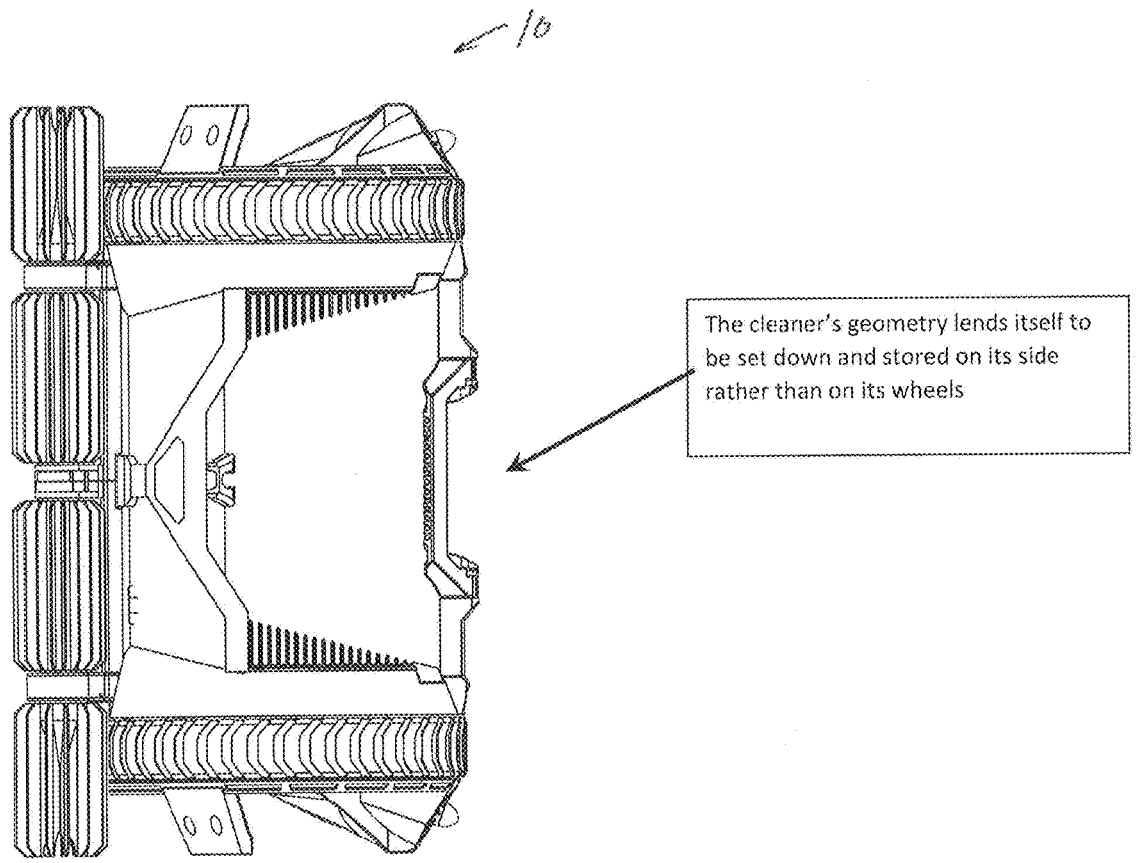
FIG. 14 is a view of the APC of FIG. 1.

End regions of body 14 may qualify as modules, hubs, or technology hubs 54. FIG. 13 depicts these regions 54, which may include motive elements 18 and pumps 46 and 50 as well as optional handles 26, drive motors, drive systems cooperating with motive elements 18, electronics, sensors, power and communication connections, etc. Hubs 54 advantageously may be interchangeable from one end region of body 14 to another, although such interchangeability is not required. As illustrated in FIG. 14, hubs 54 also may support APC 10 for storage, as the geometry of the cleaner lends itself to being set down and stored on its side.

Figure 15:
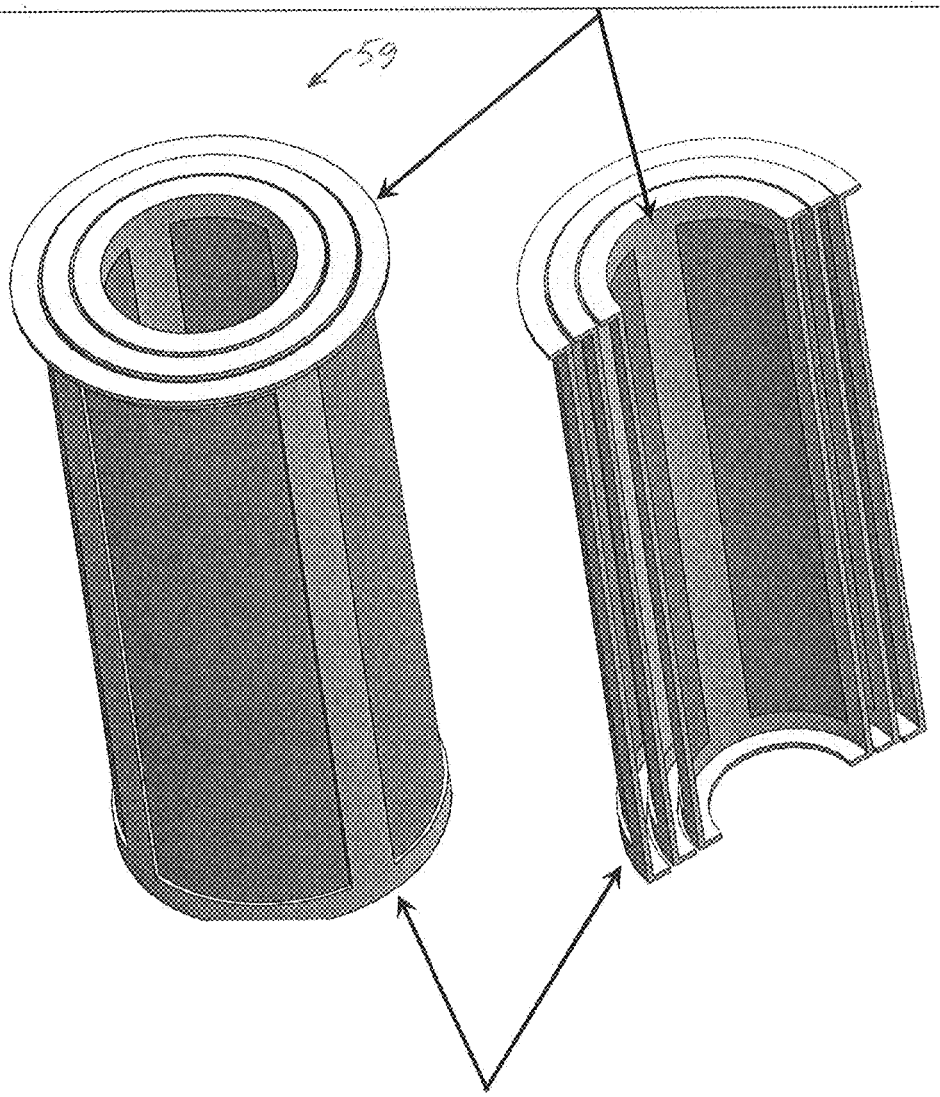
FIGS. 15-16 are perspective views of an exemplary filter assembly that may be used with, e.g., the APC of FIG. 1.
Figure 16:
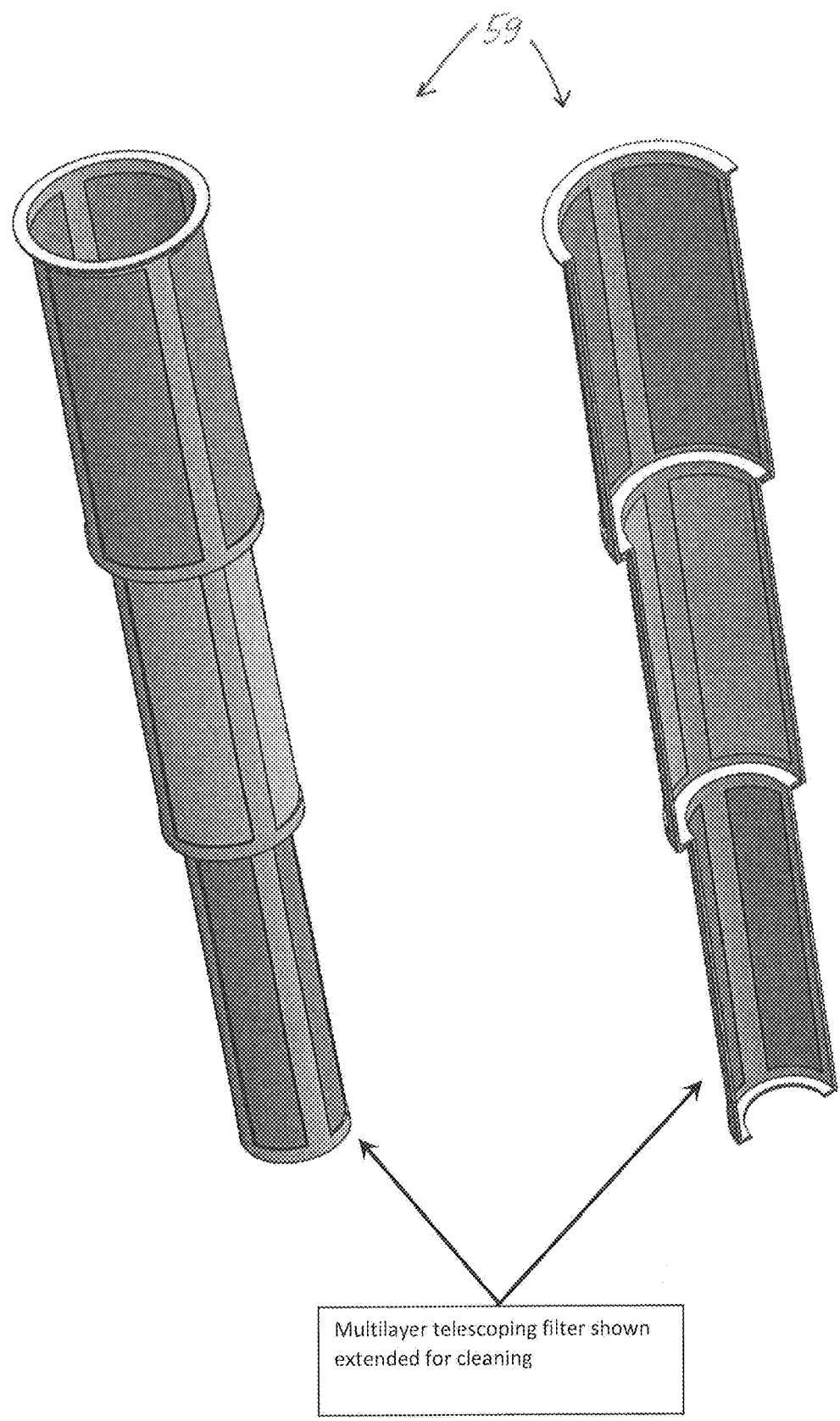

FIGS. 15-16 show an exemplary filter assembly 59 for placement wholly or partly within body 14. Filter assembly 59 may be constructed in any suitable manner; depicted in FIG. 15 is an exemplary multi-layered filter, with the layer initially encountering debris-laden water sized to filter (relatively) larger particles and each subsequent layer filtering progressively smaller particles. As noted in text accompanying FIG. 15, this structure allows both filtration of small particles and maintenance of a relatively high flow rate through the assembly 59.

FIG. 16, further, illustrates that filter assembly 59 may comprise telescoping layers of filtration material. This approach permits nesting of the layers for use. When assembly 59 is removed from APC 10 for cleaning, the layers can be extended for easy access to each filter panel, as shown in FIG. 16.

A non-exclusive list of features of APC may include:
Flip over: The drive mechanism (gears, chain or belt) can be arranged in such a way that the torque causes the brush bar to flip over to the other side when the direction is reversed. No need for an extra servo or solenoid, though both would also work.

Flip over: In side view, the optimal +/−60 degree of the thrust outlet and debris inlet to the floor is maintained but in the opposite direction.

Vacuum inlet: is an extension of the canister and protrudes directly out of the body eliminating extra body-to-canister seals.

Vacuum inlet: The canister is symmetric/bi-directional. The one-way-debris flap (black line in drawing) hinges on one side and causes the water to deflect in a spinning motion around the filter, helping to strip debris off its surface.

Sensor Bar: along with the technology hubs, this can also be a modular part housing a different set of sensors for different models.

Cylindrical body: the entire body with exception of the sensor/bush bar can be within the diameter of the wheel. This is of benefit as there are no protrusions which could cause the body to foul up on surfaces as it transitions through complex pool to wall angles and steps.

Cylindrical body: This cleaner has only 2 large wheels and a set of brushes which it utilizes to stabilise and orientate the cylindrical body's thrust and debris inlet to the surface to be cleaned. By having only 2 wheels the brushes are guaranteed to always be in contact with complex surfaces (such as stairs) to be cleaned. This can be important to effective brushing of stairs.

Brushes: The close proximity between the contact point of the set of wheels to the contact point of the brushes on a surface is beneficial to manoeuvre onto and clean narrow ledges and stairs as well as to manoeuvre over a positive stair corner with little to no interference.

Dual Pump Motors: The ability to present a wheel hub with handle to the person extracting the cleaner from the pool is further beneficial in that the lower pump motor can be used to completely drain the cleaner of water from the lowest point.

Ring Wheel: Having the mechanical workings of thrust motor, drive motor, handle, printed circuit board housing and thrust outlet all inside and through the wheel, allows for a very space efficient layout. Space between the wheels can be used solely for collecting and storing of debris. Stated differently: the ring wheels provide an additional stagnant surface on the outside of the cleaner which is utilised for thrust outlet, handle for cleaner removal and foot stands for a small storage footprint. Furthermore this footprint could be advantageous in getting a 3-4 foot wide commercial cleaner through a standard doorway.

Ring Wheel: also allows the removal of the hubcap for easy access to motors and electronics for servicing.

Technology hubs: Being modular (and the same for both sides), they can be spaced further apart to create wider or narrower cleaners each with different features.

Canister: 2× half-handles and lock mechanism.

Motors: Individually sealed motors, each with its own waterproof casing and seals and waterproof plug enable easy pool-side replacement.

APC 10 is especially adept at cleaning stairs of water-containing vessels. Its tubular body set between two large wheels (one set of wheels) in combination with a brush-set in close proximity outside of those wheels (protruding past and perhaps being close to tangent to the wheels), and the thrust at a slight rearward sloping orientation where the line of thrust is between the wheel and the brush, constitute valuable additional features of the invention. In at least some versions of APC 10, a diameter of brushes 24 is at least five times smaller than a diameter of body 14, enhancing the ability of the brushes 24 to reach into typical corners of stairs.

These examples of features of an automatic pool cleaner are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The entire contents of the Deloche patent are incorporated herein by this reference. Further, although applicant has described cleaning devices for use with water containing vessels, persons skilled in the relevant field will recognize that the present invention may be employed in other manners. Finally, references to "pools" and "swimming pools" herein may also refer to spas or other water containing vessels used for recreation or therapy and for which cleaning is needed or desired.

What is claimed is:

1. An automatic swimming pool cleaner comprising:
   a. a generally-cylindrical body having a central axis, wherein the central axis of the generally-cylindrical body is in a horizontal direction;
   b. motive elements configured to cause movement of the body in a swimming pool; and
   c. a brush adjacent the generally-cylindrical body, wherein the brush comprises an axis of rotation extending parallel to the central axis of the generally-cylindrical body.

2. An automatic swimming pool cleaner according to claim 1 further comprising a filter assembly (i) configured for placement wholly or partly within the body and (ii) comprising telescoping layers of filtration material.

3. An automatic swimming pool cleaner comprising:
   a body defining an inlet for receiving debris-laden water of a swimming pool;
   a filter assembly:
   a. positioned at least partially within the body; and
   b. comprising telescoping layers of filtration material configured to be nested in use and extended for cleaning; and
   a pump configured to exhaust filtered water out a side of the automatic swimming pool cleaner and relative to a direction of movement of the automatic swimming pool cleaner.

4. The automatic swimming pool cleaner according to claim 3 in which a first layer of the telescoping layers initially encountering debris-laden water in use filters particles of a first size and a second layer of the telescoping layers subsequently encountering the debris-laden water in use filters particles of a second size smaller than the first size.

5. An automatic swimming pool cleaner comprising:
   a. a body defining an inlet for receiving debris-laden water of a swimming pool;
   b. motive elements configured to drive the body in a first direction on a surface of the swimming pool;
   c. a filter positioned wholly or partly within the body; and
   d. a first pump configured to exhaust filtered water at (i) a first angle relative to the first direction and (ii) a second angle relative to the surface, with each of the first and second angles being none of 0°, 90°, or 180°, wherein the first pump is configured to exhaust the filtered water outside of the motive elements in a lateral direction.

6. An automatic swimming pool cleaner according to claim 5 further comprising a second pump configured to exhaust filtered water at (i) a third angle relative to the first direction and (ii) a fourth angle relative to the surface, with each of the third and fourth angles being none of 0°, 90°, or 180°.

7. An automatic swimming pool cleaner according to claim 6 in which the second pump is configured to be controlled independently of the first pump.

8. An automatic swimming pool cleaner according to claim 7 in which the body comprises a first end region and a second end region opposite the first end region, with the first pump being located in the first end region and the second pump being located in the second end region.

9. An automatic swimming pool cleaner comprising:
 a. a body comprising:
  i. an inlet;
  ii. a first end region; and
  iii. a second end region opposite the first end region, wherein the first end region and the second end region are arranged in a side-to-side direction relative to a direction of movement of the automatic swimming pool cleaner;
 b. a first pump:
  i. configured to exhaust water received through the inlet; and
  ii. located in the first end region; and
 c. a second pump:
  i. configured to exhaust water received through the inlet;
  ii. located in the second end region; and
  iii. configured to be controlled independently of the first pump.

10. An automatic swimming pool cleaner according to claim 9 further comprising:
 d. a first motive element located in the first end region;
 e. a second motive element located in the second end region;
 f. a first handle located in the first end region; and
 g. a second handle located in the second end region.

11. The automatic swimming pool cleaner comprising of claim 9, wherein the first end region further comprises a first drive motor and the second end region further comprises a second drive motor.

12. An automatic swimming pool cleaner comprising a body, the body comprising:
 i. an inlet;
 ii. a first end region containing a first motive element and a first pump configured to exhaust water received through the inlet to an exterior of the first motive element; and
 iii. a second end region opposite the first end region and such that the first region and the second region are arranged in a side-to-side direction relative to a direction of movement of the automatic swimming pool cleaner, the second end region containing a second motive element and a second pump configured to exhaust water received through the inlet to an exterior of the second motive element.

13. The automatic swimming pool cleaner comprising of claim 12, wherein the first end region further comprises a first drive motor and the second end region further comprises a second drive motor.

14. An automatic swimming pool cleaner comprising:
 a body defining an inlet for receiving water of a swimming pool;
 motive elements at opposing ends of the body and configured to move the body along a surface of a swimming pool; and
 outlets for exhausting the water from the body, wherein the motive elements are between the outlets and the body.

15. An automatic swimming pool cleaner comprising:
 a. a generally-cylindrical body;
 b. motive elements configured to cause movement of the body in a swimming pool;
 c. a brush adjacent the generally-cylindrical body; and
 d. a filter assembly (i) configured for placement wholly or partly within the body and (ii) comprising telescoping layers of filtration material.

* * * * *